Patented May 11, 1926.

1,583,782

UNITED STATES PATENT OFFICE.

AKIM P. DOBRYNIN, OF CHICAGO, ILLINOIS.

METHOD OF CURING AND PRESERVING FISH.

No Drawing.   Application filed February 11, 1925.  Serial No. 8,523.

The invention relates to a new method of curing and preserving fish, its main object being to cure and preserve fish in such a manner that it can be kept preserved for a considerable length of time without spoiling.

A further object of the invention is to deodorize the fish as it undergoes the curing process and thus to increase its palatability.

A still further object of the invention is to remove from the fish, as it undergoes the curing process, the juices which do not possess any nutritious value, and at the same time to bring about the absorption by the fish of a preservative agent.

With these general objects in view and others that will appear when the nature of the invention is better understood, the same embodies two processes, viz the process of curing and the process of drying fish. The first process comprises subjecting the fish to salt cure, and it includes making a pit in the ground having sandy soil of percolative qualities. A straw or grass mat is spread in the pit and a layer of dry salt is made thereupon. Then fifteen to twenty layers of fish are made in said pit and upon said mat, covering each layer with dry salt. It is understood that the fish deposited in the pit in the manner stated is in its natural condition, not gutted or scaled. I do not specify the amount of the salt used as it is of no great importance, but it should be stated that a sufficient amount of salt should be employed to fairly well cover thereby each layer of fish. The fish thus deposited and prepared in the pit is covered with either the same or another mat, care being taken to cover the fish on all its sides, the object being to prevent the contact and consequent contamination of the fish by the earth. The straw or grass mat is used for the reason that such a mat is porous, will not become clogged with salt and earth, and will readily permit drainage of the fish juices to be subsequently absorbed by the earth. When the fish has been stored in the pit and wrapped in the mat in the manner stated it is then buried in the ground by covering it with earth, one of the objects thereof being to eliminate the access of air while the fish undergoes the herein described salt cure.

The fish so buried should remain in the ground from three to seven days. The precise length of time required for the completion of the cure cannot be definitely determined in advance owing to various considerations, most important of which are the amount of salt used, the nature of the earth in which the fish remains buried, the weather, and the temperature. The completion of the cure by the hereinbefore described curing process will be indicated by the appearance of the fish, viz when the cure is completed the eyes of the fish will assume red or reddish color.

Obviously not infrequently it will be inconvenient or impractical to bury the fish in the ground owing to the lack of suitable ground or due to other causes, and for this reason I have devised a modified curing process in accordance with which the fish is cured in wooden vessels or vats. A vessel with a perforated bottom is used for permitting drainage. A comparatively thick layer of suitable earth is made at the bottom of the vessel, said layer is then covered with a mat upon which a layer of salt is made, and then fish is placed in layers, salting each layer. When a sufficient number of layers of fish has been made the fish is covered with another mat and another layer of earth is made thereon. This modified form of the curing process will give in many instances as good a result as is obtained from the preferred form thereof.

The important object of burying or enveloping the fish in the earth is to deodorize it. The salt will draw off the juices of the fish and with them the characteristic fish odor which will be continually absorbed by the contiguous earth. Thus the earth will act as an absorbing agent for said juices and odor. The juices of the fish as well as the humidity of the earth will keep the salt moist, and thus the maximum strength of the salt will be had to act upon the fish, unlike the strength of brine which is ordinarily employed in curing fish. Of course, an amount of salt will be absorbed by the fish itself. Thus, it will be seen, that the salt performs a double function, viz it acts as a preservative agent by being absorbed by the fish, and also acts as an agent for drawing off the juices of the fish to be subsequently absorbed by the earth.

The usual salt curing process now in use is soaking the fish in brine. That process is not satisfactory for the reason that it has very little effect, if any, on the odor of the fish. Furthermore the brine softens the flesh of the fish necessitating a longer time for drying. The most serious objection, however, to the brine cure resides in the fact that the brine instead of drawing off the juices of the fish has a tendency of supplying additional juices by being itself absorbed by the fish.

When the fish has undergone the hereinabove described curing process I remove it from the ground and rinse it in brine, the object being to wash off any visble grains of salt. I employ brine for that purpose in preference to fresh water as it is not desirable to wash off all the salt of the fish, in which latter case worms might set in the head and gills of the fish when it is subjected to the drying process presently described.

The next step in the method consists in stringing the fish on rods or wires and allowing the same to dry in the open and in the sun. This drying process lasts from two to five weeks, the duration depending upon dry weather and the amount of sunshine. Care must be taken not to expose the fish to rain. In case of an inclement weather the fish should be removed to a dry covered place having a good circulation of air. The completion of the drying process will be indicated by the looseness of the skin on the fish. When it peels off readily the process is completed.

The fish cured and dried by the method herein described will be ready for consumption without any further preparing. When thus cured and preserved it may be kept, when in dry place, for a year or longer.

While there is herein described the preferred embodiment of the present invention, it is nevertheless to be understood that minor changes may be made therein without departing from the spirit and scope of the invention as claimed.

What I claim as new is:

1. The method of curing and preserving fish comprising covering ungutted and unscaled fish by a preservative agent, said agent being capable of partial absorption by the fish and of drawing off the juices therefrom, enveloping the fish and said preservative agent in an absorbent for absorbing said juices, and then removing and drying the fish.

2. The method of curing and preserving fish comprising salting ungutted and unscaled fish, wrapping the salted fish within a grass mat, enveloping the wrapped fish in an absorbent for absorbing the juices and odor of the fish, and then removing and drying the fish.

3. The method of curing and preserving fish comprising salting ungutted and unscaled fish, wrapping the salted fish within a grass mat, burying the wrapped fish in the earth for absorbing the juices and odor of the fish, and then removing and drying the fish.

4. The method of curing and preserving ungutted and unscaled fish comprising making a comparatively thick layer of earth at the bottom of a vessel, said bottom being perforated for permitting drainage, covering said layer with a mat, depositing a number of layers of fish, salting each layer, covering said layers of fish with a mat and earth, and then removing and drying the fish.

In testimony whereof I affix my signature.

AKIM P. DOBRYNIN.